United States Patent Office 2,801,999
Patented Aug. 6, 1957

2,801,999

PROCESS OF PREPARING ISOBUTYRIC ACID ESTERS OF CELLULOSE

Carl J. Malm and Loring W. Blanchard, Jr., Rochester, N. Y., assignors to Eastman Kodak Company, Rochester, N. Y., a corporation of New Jersey No Drawing. Application June 7, 1954,
Serial No. 435,041

5 Claims. (Cl. 260—227)

This invention relates to a method for the manufacture of isobutyric acid esters of cellulose having an isobutyryl content of at least 25% and an intrinsic viscosity of at least 1.5 by reacting upon an activated cellulose with isobutyric anhydride in the presence of zinc chloride.

The prior art has described in a few places the making of isobutyric acid esters of cellulose. In those procedures the cellulose has either been degraded in the course of the esterification so that a low viscosity product is obtained or some other acyl than isobutyryl has been present in the esterification bath in sufficiently large quantities that cellulose esters containing only a small proportion, if any, of isobutyryl groups result. The products obtained by the present process differ substantially from the cellulose esters which have been prepared previously with isobutyric acid or anhydride. As isobutyric acid is characterized by a negligible odor at all but high concentrations, the isobutyric acid esters of cellulose have many advantages over the normal butyric acid esters of cellulose.

One object of our invention is to provide a method of preparing isobutyric acid esters of cellulose by reacting upon cellulose with an esterification bath comprising isobutyric anhydride and a zinc chloride catalyst. Another object of our invention is to provide a method for preparing isobutyric acid esters of cellulose of good viscosity. A further object of our invention is to provide a method of preparing isobutyric acid esters of cellulose in which the isobutyryl content of the esters thus prepared is at least 25%. Other objects of our invention will appear herein.

We have found that isobutyric acid esters of cellulose of a sufficiently high viscosity for use in making products of good physical properties can be prepared by activating cellulose to impart an activation value thereto of at least a certain selected value and then esterifying the so-activated cellulose in an esterification bath having a high isobutyric anhydride concentration and a substantial zinc chloride content, the liquid to cellulose ratio therein being not over a certain value. Products thus prepared exhibit characteristics which make those products valuable for various uses such as plastics or molded products, sheeting, protecting coatings and various other purposes for which cellulose esters characterized by a high normal butyryl content have been used heretofore. In its broadest aspects our invention comprises activating cellulose to impart thereto an activation value of at least 0.2 and the esterification of that cellulose in an esterification bath essentially consisting of isobutyric anhydride and zinc chloride catalyst, the liquid to cellulose ratio being no more than 8:1 parts by weight, the isobutyric anhydride concentration of the liquid therein being at least 60% and zinc chloride in an amount at least 20% of the weight of the cellulose. The esterification proceeds at a temperature of 100–150° F.

The cellulose is treated preliminary to its esterification to impart an activation value of at least 0.2 thereto, this value being the rate in degrees C. per minute that 1 part of the cellulose acetylates adiabatically with 10 parts of acetic anhydride in 20 parts of acetic acid, starting at 20° C., using 0.072 mol of sulfuric acid catalyst per 100 grams of cellulose as described in the article of Malm et al. in Industrial and Engineering Chemistry, December 1952, vol. 44, page 1904. The preferred method of activating cellulose for the preparation of isobutyric acid esters thereof in accordance with our invention, which method imparts an activation value greater than 0.2 to the cellulose, is by first treating the cellulose with water, displacing the water from the cellulose with acetic acid and the acetic acid with isobutyric acid, which type of activation is described and claimed in U. S. Patent 2,622,080 of Richter et al. However, any other method of activating cellulose to impart an activation value thereto of at least the limit given may be employed such as treatment of the cellulose with 10% aqueous NaOH solution followed by washing with water, removal of the water with acetic acid and removal of the acetic acid with isobutyric acid. Another method of activation which may be employed is by treatment of the cellulose with 70% aqueous acetic acid followed by removal of the acetic acid with isobutyric acid.

Any method of activating cellulose which imparts an activation value of at least 0.2 thereto may be employed. The treating materials should be removed from the cellulose with isobutyric acid prior to the esterification proper. It is preferable that the activated cellulose have a cuprammonium viscosity of at least 1000 cps.

After the cellulose has been activated and while still wet with isobutyric acid it is mixed with isobutyric anhydride and zinc chloride in such proportions that the isobutyric anhydride constitutes at least 60% of the liquid portion of the mass. Zinc chloride is used in an amount at least 20%, preferably at least 50%, of the weight of the cellulose and the liquid to cellulose ratio is not more than 8:1 parts by weight and preferably below 6:1. It is desirable that the isobutyric anhydride constitute at least 80% of the liquids in the esterification bath. The reaction is carried out preferably at temperatures greater than 120° F. but the use of temperatures above 100° F. for the esterification procedure is also included in the scope of our invention. Our invention makes possible the manufacture of cellulose esters having substantial intrinsic viscosities and therefore it is ordinarily desirable to operate at a temperature of no more than 170° F. However, the reaction described can be operated at higher temperatures if the viscosity of the product obtained is not important.

If desired the esterification may be carried out without any other acyl groups than isobutyryl in the esterification mass although in some cases the operator may desire to include small proportions of other lower fatty acid compounds such as propionic acid or anhydride, normal butyric acid or anhydride or acetic acid or anhydride such as in proportions less than 30% of the acid-anhydride mixture in the esterification bath. For the preparation of cellulose esters of higher viscosities it is desirable to use as the catalyst amounts of zinc chloride within the range of 25–75% based on the weight of the cellulose. By using 50–75% of zinc chloride (based on the weight of cellulose) and esterification temperatures above 130° F. the reaction goes readily and isobutyric esters of high viscosity are obtained within a comparatively short time such as within 4 to 10 hours.

The following examples illustrate our invention:

*Example 1*

35 parts of acetylation grade cellulose was activated by soaking it for ½ hour in mineral free water at 80° C., displacing the water from the cellulose with acetic acid and then displacing the acetic acid therefrom with isobutyric acid so as to obtain a mixture of 35 parts of cellulose having an activation value of above 0.2 and 30 parts of isobutyric acid. This material was placed in a 50 gallon bronze Werner-Pfleiderer mixer to which was added 150 parts of isobutyric anhydride and 17.5 parts of zinc chloride. The mixter was run with the temperature maintained within the range of 130–145° F. After 5½ hours the cellulose had gone into solution and there was then added a mixture of 10 parts of distilled water and 100 parts of acetic acid. The cellulose isobutyrate obtained was recovered by precipitating in water. The product thus obtained was found to have an intrinsic viscosity in acetic acid of 1.67.

*Example 2*

35 parts of cellulose was activated by soaking it in water for ½ hour at 20° C., replacing the water with acetic acid and replacing the acetic acid with isobutyric acid. The thus activated cellulose which also contained 29 parts of isobutyric acid were loaded into a bronze Werner-Pfleiderer mixer together with 150 parts of isobutyric anhydride and 17.5 parts of zinc chloride. The mixture was run with the temperature maintained at 120–124° F. After 17.5 hours the cellulose had dissolved to form a mass free of grain and fiber. There was then added to the mass a mixture of 10 parts of distilled water and 100 parts of acetic acid and the cellulose isobutyrate obtained was isolated by precipitation in water. The acetic acid intrinsic viscosity of the cellulose isobutyrate obtained was 1.93.

*Example 3*

A mixture of 3.5 parts of cotton linters and 2.8 parts of isobutyric acid, resulting from the activation of the linters with water, displacing of the water with acetic acid and displacing of the acetic acid with isobutyric acid, were placed in a Werner-Pfleiderer mixer together with 10.5 parts of isobutyric anhydride, 1.25 parts of acetic anhydride and 1.8 parts of zinc chloride. The mixer was run with the temperature maintained within the range of 124–138° F. After 8½ hours the cellulose had completely dissolved. A mixture of 1 part of distilled water and 9 parts of acetic acid was added to the mass and the cellulose acetate isobutyrate therein was obtained by precipitation with water. The intrinsic viscosity of the product obtained in acetic acid was 1.93.

We claim:

1. A method of preparing isobutyric acid esters of cellulose which comprises reacting upon cellulose having an activation value of at least 0.2 and a cuprammonium viscosity of at least 1000 cps. with an esterification bath comprising isobutyric anhydride and zinc chloride catalyst at a temperature within the range of 100–170° F. in which the liquid to cellulose ratio is no more than 8:1 by weight of which liquid at least 60% is isobutyric anhydride, the zinc chloride is at least 20% based on the weight of the cellulose and the isobutyryl compounds constitute at least 70% of the acid and anhydride in the esterification bath whereby a cellulose ester is obtained having an isobutyryl content of at least 25% and an intrinsic viscosity in acetic acid of at least 1.5.

2. A method of preparing isobutyric acid esters of cellulose which comprises reacting upon cellulose having an activation value of at least 0.2 and a cuprammonium viscosity of at least 1000 cps. with an esterification bath comprising isobutyric anhydride, isobutyric acid and zinc chloride catalyst, in which the liquid to cellulose ratio is no more than 8:1 by weight of which liquid at least 60% is isobutyric anhydride, the zinc chloride is at least 20% of the weight of the cellulose, the isobutyric anhydride and acid constitute at least 70% of the anhydride and acid in the esterification bath and the esterification is carried out at a temperature within the range of 100–170° F. whereby a cellulose ester is obtained having an isobutyryl content of at least 25% and an intrinsic viscosity in acetic acid of at least 1.5.

3. A method of preparing cellulose isobutyrate which comprises reacting upon cellulose having an activation value of at least 0.2 and a cuprammonium viscosity of at least 1000 cps. with an esterification bath essentially consisting of isobutyric anhydride, isobutyric acid and zinc chloride catalyst in which the liquid to cellulose ratio is no more than 8:1 by weight of which liquid at least 60% is isobutyric anhydride, the zinc chloride is 25–75% of the weight of the cellulose, substantially all of the acyl in the bath is isobutyryl and the esterification is carried out at a temperature of 100–170° F. whereby cellulose isobutyrate having an intrinsic viscosity in acetic acid of 1.5 results.

4. A method of preparing cellulose acetate isobutyrate which comprises reacting upon cellulose having an activation value of at least 0.2 and a cuprammonium viscosity of at least 1000 cps. at a temperature of 100–170° F. with an esterification bath comprising isobutyric anhydride, acetic anhydride and zinc chloride catalyst in which the liquid to cellulose ratio is no more than 8:1 by weight of which liquid the isobutyric anhydride constitutes at least 60%, the zinc chloride is at least 20% of the weight of the cellulose and the isobutyryl compounds constitute more than 70% of the anhydride and acid in the esterification bath whereby a cellulose ester is obtained having an isobutyryl content of at least 25% and an intrinsic viscosity in acetic acid of at least 1.5.

5. A method of preparing isobutyric acid esters of cellulose which comprises reacting upon cellulose having an activation value of at least 0.2 and a cuprammonium viscosity of at least 1000 cps. at a temperature of 120–150° F. with an esterification bath comprising isobutyric anhydride and zinc chloride catalyst in which the ratio of liquid to cellulose is less than 6:1 by weight, the isobutyric anhydride concentration is at least 80%, the zinc chloride is 25–75% of the weight of the cellulose and the isobutyryl compounds constituting more than 70% of the anhydride and acid mixture in the esterification bath whereby a product is obtained having an isobutyryl content of at least 25% and an intrinsic viscosity in acetic acid of at least 1.5.

References Cited in the file of this patent

UNITED STATES PATENTS

| | | |
|---|---|---|
| 2,024,651 | Malm | Dec. 17, 1935 |
| 2,353,423 | Tinsley | July 11, 1944 |
| 2,362,576 | Malm | Nov. 14, 1944 |
| 2,373,630 | Martin et al. | Apr. 10, 1945 |
| 2,376,422 | Dreyfus | May 22, 1945 |
| 2,622,080 | Richter et al. | Dec. 16, 1952 |